(12) United States Patent
Shestatski et al.

(10) Patent No.: US 8,590,569 B2
(45) Date of Patent: Nov. 26, 2013

(54) METERING BALL VALVE

(75) Inventors: Felix Shestatski, Karmiel (IL); Leon Slobitker, Karmiel (IL); Boris Margol, Nahariya (IL); Isak Braverman, Migdal-Ha-Emeq (IL)

(73) Assignee: Ham-Let (Israel-Canada) Ltd., Nazareth Illit (IL)

( * ) Notice: Subject to any disclaimer, the term of this patent is extended or adjusted under 35 U.S.C. 154(b) by 0 days.

(21) Appl. No.: 13/818,430

(22) PCT Filed: Aug. 25, 2011

(86) PCT No.: PCT/IL2011/000688
§ 371 (c)(1),
(2), (4) Date: Apr. 4, 2013

(87) PCT Pub. No.: WO2012/025929
PCT Pub. Date: Mar. 1, 2012

(65) Prior Publication Data
US 2013/0187074 A1    Jul. 25, 2013

Related U.S. Application Data

(60) Provisional application No. 61/376,682, filed on Aug. 25, 2010.

(51) Int. Cl.
*F16K 11/22* (2006.01)

(52) U.S. Cl.
USPC ............ 137/625.29; 137/599.08; 137/601.16; 137/601.19

(58) Field of Classification Search
USPC ............ 137/599.08, 601.16, 601.18, 601.19, 137/625.29
See application file for complete search history.

(56) References Cited

U.S. PATENT DOCUMENTS

| | | | | |
|---|---|---|---|---|
| RE18,430 | E | * | 4/1932 | Roberts .................... 137/601.16 |
| 1,921,779 | A | | 8/1933 | Roberts |
| 1,973,418 | A | | 9/1934 | Sibley |
| 2,013,822 | A | * | 9/1935 | Bradbury ...................... 251/221 |
| 2,257,880 | A | | 10/1941 | Harper |
| 2,959,187 | A | * | 11/1960 | Boyle ............................ 137/456 |
| 2,987,078 | A | * | 6/1961 | Du Perow ................ 137/599.17 |
| 4,848,401 | A | * | 7/1989 | Devilleger et al. ....... 137/601.16 |

FOREIGN PATENT DOCUMENTS

| | | |
|---|---|---|
| DE | 103 809 C | 4/1897 |
| DE | 103809 | 4/1897 |
| GB | 508 337 A | 6/1939 |
| GB | 0508337 | 6/1939 |
| GB | 2 238 094 A | 5/1991 |
| GB | 2238094 A | 5/1991 |

OTHER PUBLICATIONS

International Search Report and Written Opinion dated Nov. 29, 2011 in corresponding International Application No. PCT/IL2011/000688.

* cited by examiner

*Primary Examiner* — John Fox
(74) *Attorney, Agent, or Firm* — The Law Office of Michael E. Kondoudis

(57) ABSTRACT

The valve is switchable between metering, full flow and shut off configurations. The preferred embodiments of the inventions include a metering-full flow, a metering-shut off and metering-shut off-full flow valves.

21 Claims, 7 Drawing Sheets

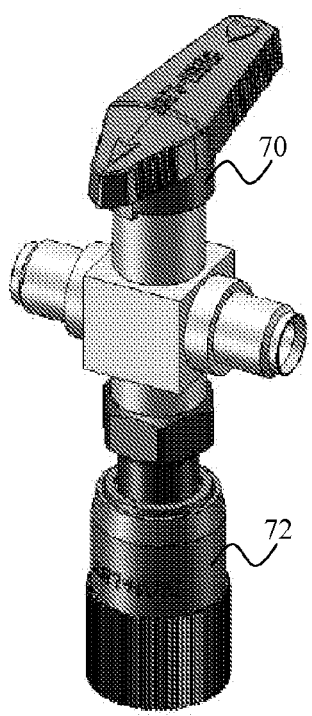 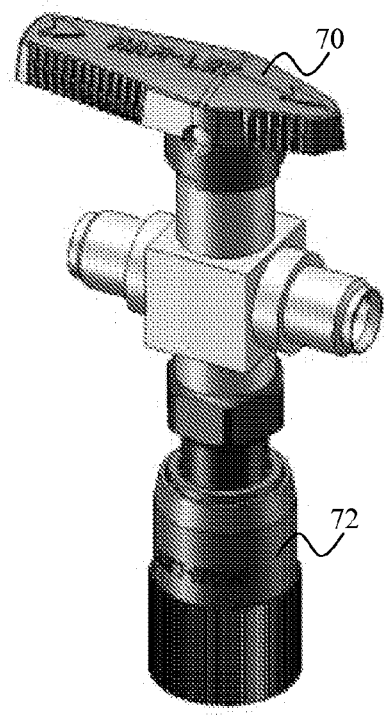
Fig. 4a Fig. 4b

METERING BALL VALVE

FIELD OF THE INVENTION

The present invention generally relates to valves, and more specifically, to a combination of a ball valve with a needle and/or metering valve.

BACKGROUND OF THE INVENTION

Valves suitable for use in instruments and instrumentation systems are well known. One particularly useful type of valve for these systems comprises a ball valve. Generally, a ball valve includes a chamber or body with an internal valve chamber with inlet and outlet passages.

A ball valve member is disposed within the internal valve chamber. The ball valve member comprises a stainless steel ball positioned centrally within the chamber and a cylindrical valve stem which extends from the ball axially through the chamber to a location outside the body. Packing material surrounds the ball and stem and fills the voids between the ball and the chamber, except for passages which extend from the inlet and outlet passages in the body to the ball. A handle attached to the operating stem allows the ball to be rotated, thereby selectively aligning passages in the ball with the inlet and outlet passages in the body. The ball valve can be a two-way valve with a single inlet and single outlet passage, or a three-way valve with a single inlet and a pair of outlet passages, or a pair of inlet passages and one outlet passage, depending on what the particular application requires.

A needle valve is a type of valve in which a valve member, or a needle, is mounted within a valve body for axial movement along a valve closure axis into, and out of, a valve seat cavity. Flow passages, opening into the valve seat cavity, are formed in the valve body so that the valve can be closed by inserting the needle into the valve seat cavity and opened by withdrawing the needle from the valve seat cavity while providing more accurate control for the passage of the fluid to the outlet.

As illustrated in FIG. 1, a ball valve 2 and a needle valve 4 can be combined in a parallel manner to control the passage of a fluid within pipeline 6. These two kinds of valves are usually installed parallel to each other in order to exploit the advantages of each one of the valves for various needs. This solution which is illustrated in FIG. 1 suffers from different disadvantages such as: variety of components, many potential leakage points, cost-effectiveness, elevated labor costs, elevated chances for damages, and other disadvantages.

Therefore, there is a long felt need to develop a compact valve which will encapsulate both a ball valve and a needle valve in a single construction. The present invention is intended to comply with this requirement.

The known in the art valve suffer from the following disadvantages:
1. Ball valves do not have a regulation mode which is between a fully opened mode and a fully closed mode. The known in the art ball valves are designed to operate only for shut-off control.
2. Metering valves are designed to regulate flow in a precise manner, and are not suitable for shut-off control.

SUMMARY OF THE INVENTION

It is one object of the present invention to provide a valve for controlling a passage of a fluid. The valve comprises:
a. a body having: a first bore and a second bore extending axially inwardly from the exterior of the body and defining a valve chamber therebetween, a first outlet fluidly connected to the valve chamber, and an inlet fluidly connected to the valve chamber;
b. a first bonnet connectable to the first bore and having a first opening axially aligned with the first bore;
c. a second bonnet connectable to the second bore and having a second opening axially aligned with the second bore;
d. a ball member adapted to be disposed within the valve chamber, the ball member comprising a first passage adapted to allow passage of the fluid between the inlet and the first outlet; and
e. a first actuating stem connectable to the ball member adapted to be located within the first opening of the first bonnet and to control the passage of the fluid between the inlet and the first outlet;

It is within the scope of the present invention that the valve further comprises: a second outlet fluidly connectable to the valve chamber through the second opening of the second bonnet; a second passage within the ball member adapted to provide passage of the fluid between the inlet and the second outlet; and a second actuating stem adapted to be located within the second opening of the second bonnet and having a controlling end fitted to be received within the second bore, so as to control the passage of the fluid between the inlet and the second outlet.

It is another object of the present invention to provide the valve as defined above, wherein the inlet is fluidly connectable to a fluid source.

It is another object of the present invention to provide the valve as defined above, wherein at least part of the first passage and at least part of the second passage share a common passage.

It is another object of the present invention to provide the valve as defined above, wherein the first actuating stem is adapted to control the passage of the fluid between the inlet and the first outlet by reconfiguring the ball member from a SHUT OFF POSITION to an FULL FLOW POSITION, and vice versa, in the SHUT OFF POSITION the passage of the fluid between the inlet and the first outlet through the first passage is prevented, and in the FULL FLOW POSITION the passage of the fluid between the inlet and the first outlet through the first passage is available; further wherein the second actuating stem is adapted to control the passage of the fluid between the inlet and the second outlet by reconfiguring the controlling end from a CLOSED METERING POSITION to an OPENED METERING POSITION, and vice versa, in the CLOSED METERING POSITION the passage of the fluid between the inlet and the second outlet through the second passage is prevented, and in the OPENED METERING POSITION the passage of the fluid between the inlet and the second outlet through the second passage is available.

It is another object of the present invention to provide the valve as defined above, wherein in a combination of the CLOSED METERING POSITION of the second actuating stem, and the FULL FLOW POSITION of the first actuating stem, the fluid is able to pass exclusively between the inlet and the first outlet.

It is another object of the present invention to provide the valve as defined above, wherein in a combination of the OPENED METERING POSITION of the second actuating stem, and the SHUT OFF POSITION of the first actuating stem, the fluid is able to pass exclusively between the inlet and the second outlet.

It is another object of the present invention to provide the valve as defined above, wherein in a combination of the OPENED METERING POSITION of the second actuating stem, and the OPENED BALL POSITION of the first actuating stem, the fluid is able to pass between the inlet and the first outlet, and between the inlet and the second outlet in a combined manner.

It is another object of the present invention to provide the valve as defined above, wherein the second actuating stem is in an intermediate position between said OPENED METERING POSITION and CLOSED METERING POSITION.

It is another object of the present invention to provide the valve as defined above, further comprising a first packing bolt threadably connectable to the first bonnet, the first packing bolt is adapted to compress a first packing material locatable between the first packing bolt and the first actuating stem.

It is another object of the present invention to provide the valve as defined above, wherein the first packing bolt is threadably connectable to the first opening of the first bonnet.

It is another object of the present invention to provide the valve as defined above, further comprising a second packing nut threadably connectable to the second bonnet, the second packing nut is adapted to compress a second packing material locatable between the second packing nut and the second actuating stem.

It is another object of the present invention to provide the valve as defined above, wherein the second packing nut is threadably connectable to the outer portion of the second bonnet.

It is another object of the present invention to provide the valve as defined above, wherein the first actuating stem comprises a first handle adapted to rotate the first actuating stem.

It is another object of the present invention to provide the valve as defined above, wherein the second actuating stem comprises a second handle adapted to rotate the second actuating stem.

It is another object of the present invention to provide a method of manufacturing a valve. The method comprises steps of:
a. providing a body having: a first bore and a second bore extending axially inwardly from the exterior of the body and defining a valve chamber therebetween, a first outlet fluidly connected to the valve chamber, and an inlet fluidly connected to the valve chamber;
b. disposing a ball member within the valve chamber, the ball member comprising a first passage adapted to allow passage of the fluid between the inlet and the first outlet;
c. connecting a first bonnet having a first opening to the first bore, such that the first bonnet being axially aligned with the first bore;
d. connecting a second bonnet having a second opening to the second, such that the second bonnet being axially aligned with the second bore;
e. connecting a first actuating stem to the ball member, the first actuating stem being adapted to be threaded within the first opening of the first bonnet and to control the passage of the fluid between the inlet and the first outlet;

It is within the scope of the present invention that the method further comprises steps of:
f. providing a body having a second outlet connectable to the valve chamber through the second bonnet;
g. providing a second passage within the ball member adapted to provide passage of the fluid between the inlet and the second outlet;
h. connecting a second actuating stem to the second bonnet by inserting the second actuating stem to the second opening of the second bonnet, the second actuating stem having a controlling stem fitted to be received within the second bore, so as to control the passage of the fluid between the inlet and the second outlet;

It is another object of the present invention to provide a method of manufacturing a valve as defined above, wherein at least part of the first passage and at least part of the second passage share a common passage.

It is another object of the present invention to provide a method of manufacturing a valve as defined above, wherein the first actuating stem is adapted to control the passage of the fluid between the inlet and the first outlet by reconfiguring the ball member from a SHUT OFF POSITION to a FULL FLOW POSITION, and vice versa, in the SHUT OFF POSITION the passage of the fluid between the inlet and the first outlet through the first passage is prevented, and in the FULL FLOW POSITION the passage of the fluid between the inlet and the first outlet through the first passage is available; further wherein the second actuating stem is adapted to control the passage of the fluid between the inlet and the second outlet by reconfiguring the controlling end from a CLOSED METERING POSITION to a OPENED METERING POSITION, and vice versa, in the CLOSED METERING POSITION the passage of the fluid between the inlet and the second outlet through the second passage is prevented, and in the OPENED METERING POSITION the passage of the fluid between the inlet and the second outlet through the second passage is available.

It is another object of the present invention to provide a method of manufacturing a valve as defined above, wherein the second actuating stem is adapted to provide more accurate control than the first actuating stem for the passage of the fluid from the inlet.

It is another object of the present invention to provide a method of manufacturing a valve as defined above, further comprising steps of: providing a first packing bolt; compressing a first packing material between the first packing bolt and the first actuating stem; and threadably connecting the first packing bolt to the first bonnet.

It is another object of the present invention to provide a method of manufacturing a valve as defined above, further comprising steps of: providing a second packing nut; compressing a second packing material between the second packing nut and the second actuating stem; and threadably connecting the second packing nut to the second bonnet.

It is another object of the present invention to provide a method of manufacturing a valve as defined above, further comprising step of connecting a first handle to the first actuating stem, the first handle is adapted to rotate the first actuating stem.

It is another object of the present invention to provide a method of manufacturing a valve as defined above, further comprising step of connecting a second handle to the second actuating stem, the second handle is adapted to rotate the second actuating stem.

BRIEF DESCRIPTION OF THE FIGURES

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIGS. 4a and 4b are illustrations of a prospective views of the specific embodiment of the present invention.

Figure 1:
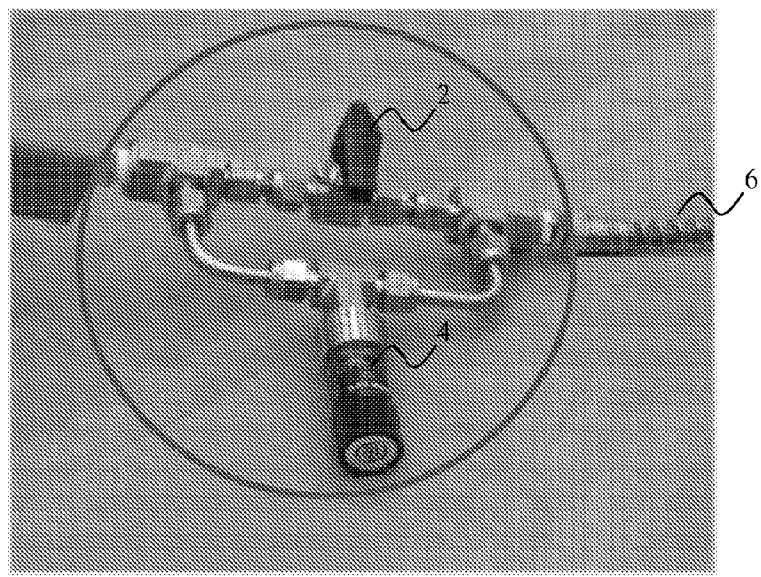
FIG. 1 is an illustration of the prior art connection of a ball valve with a needle valve connected in a parallel manner.

The drawings together with the description make apparent to those skilled in the art how the invention may be embodied in practice.

DETAILED DESCRIPTION OF THE PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention discloses a valve which is a combination of a needle valve and a ball valve. According to some embodiments, the combination of a needle valve and a ball valve in a single construction may be used for implementing the advantages of each one of the valves. For example, the ball valve may be used for instantly opening a passage to a fluid within a pipe, and for instantly closing said passage. On the other hand, the needle valve may be implemented for providing an accurate control of the amount of fluid which may pass within the pipe.

According to different aspects of the invention, the elements which are implemented in the present invention may be equivalent to any other elements which may be implemented in ball valves and/or needle valves. The present invention is not limited to the specific embodiment of the needle valve and the ball valve which are presented below.

According to different embodiments of the present invention, the present invention has a ball valve with a ball member. The ball member of the present invention is characterized by at least one additional passage extending within the same. This passage is additional to the known in the art passage which is usually used in a ball member of a ball valve.

It is noted that the present invention is not limited to ball valves and needle valves. According to different embodiments, the present invention may be used for a combination of other types of valves.

The term 'ball member' refers hereinafter to a rounded element which is usually used in a ball valve for controlling and providing the passage of a fluid within the valve.

The term 'needle valve' refers hereinafter to a valve has a relatively small orifice with a long, tapered seat, and a needle-shaped plunger, on the end of a screw, which exactly fits this seat.

The term 'metering valve' refers hereinafter to a particular design of a needle valve, that has a thin and sensitive needle.

According to different embodiments of the present invention, the terms 'needle valve' and 'metering valve' may refer to the same type of valve. For example, the term "needle valve" may refer the term 'metering valve', and vice versa.

The present invention is a design of single valve component, which includes both shut-off and sensitive flow regulation, in a single product. In other words, the present invention is a combination of a ball valve with a needle valve (or a metering valve). This combination is able to exploit the advantages of each one of the valve and thereby provide a synergetic effect.

The present invention is able to provide an excessive flow for a metering valve member due to full flow in the ball valve member, which is not possible in known in the art needle valves (or metering valves) due to limited construction of orifices within the same.

Figure 2:
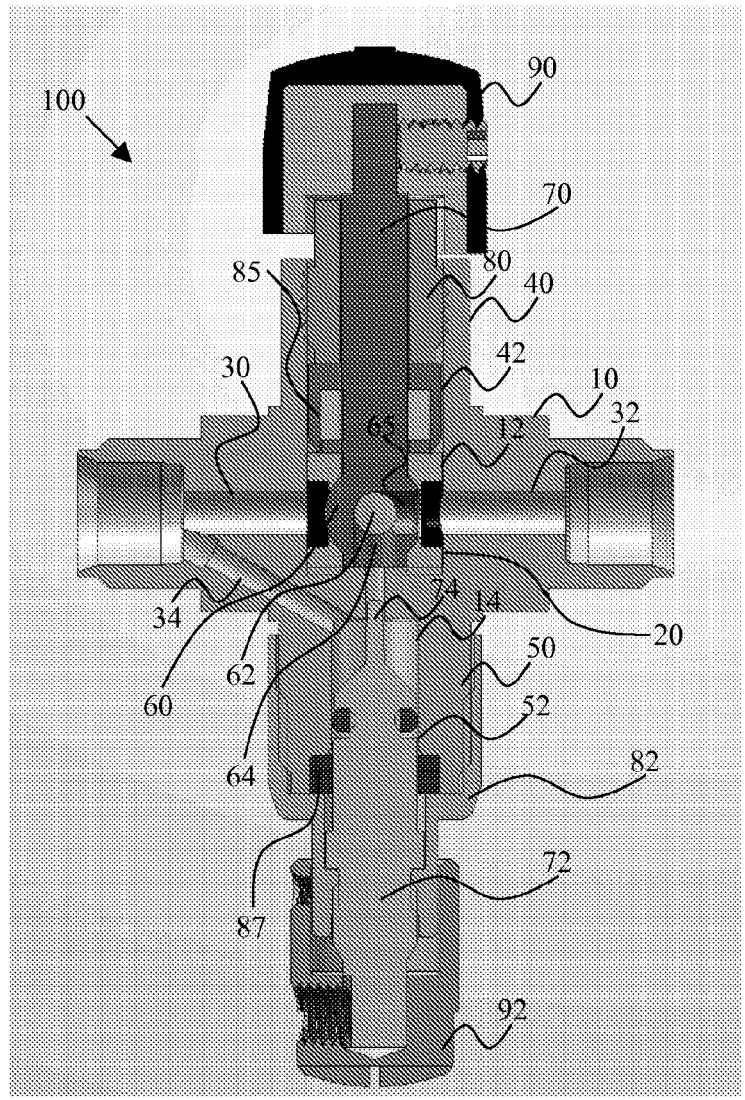
FIG. 2 is an illustration of a specific embodiment of the present invention.
Figure 3:
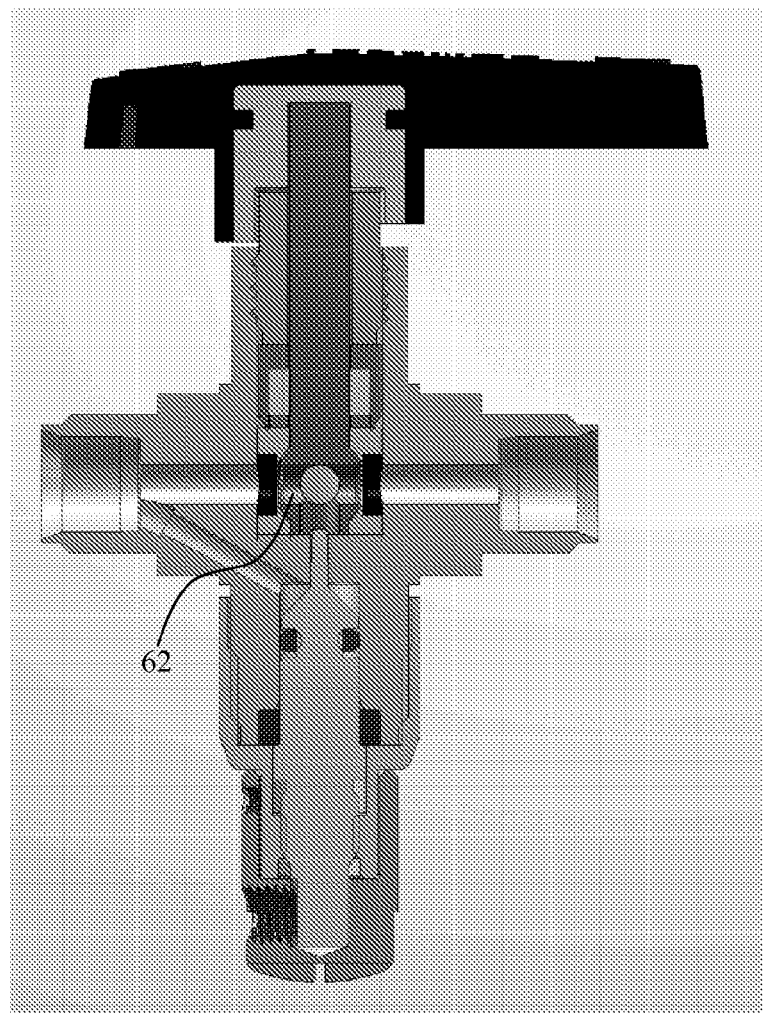
FIG. 3 is an illustration of a specific embodiment of the present invention.

Reference is now made to FIGS. 2-3 which schematically illustrate a specific embodiment of valve 100 of the present invention. Valve 100 may be used for controlling a passage of a fluid within a pipe. According to this embodiment, valve 100, comprises the following components:

a. A body 10 which comprises: a first bore 12 and a second bore 14 which extend axially inwardly from the exterior of body 10 and define a valve chamber 20 therebetween; a first outlet 30 fluidly connected to valve chamber 20, and an inlet 32 fluidly connected to valve chamber 20.

b. A first bonnet 40 which may be connected to first bore 12 and having a first opening 42 axially aligned with first bore 12.

c. A second bonnet 50 which may be connected to second bore 14 and having a second opening 52 axially aligned with second bore 14.

d. A ball member 60 disposed within valve chamber 20. Ball member 60 comprises a first passage 62 adapted to allow passage of the fluid between inlet 32 and first outlet 30.

e. A first actuating stem 70 connectable to ball member 60 adapted to be located within first opening 42 of first bonnet 40 and to control the passage of the fluid between inlet 32 and first outlet 30.

According to certain embodiments of the present invention, valve 100 further comprises the following components:

f. A second outlet 34 fluidly connectable to valve chamber 20 through second opening 52 of second bonnet 50.

g. A second passage 64 within ball member 60 adapted to provide passage of fluid between inlet 32 and second outlet 34.

h. A second actuating stem 72 adapted to be located within second opening 52 of second bonnet 50 and having a controlling end 74 fitted to be received within second bore, so as to control the passage of the fluid between inlet 32 and second outlet 34.

According to the specific embodiment of valve 100 as illustrated in FIGS. 2-3, inlet 32 is fluidly connectable to a fluid source (not shown). Furthermore, according to this embodiment, first and second passages 62 and 64 share a common passage 65.

According to the embodiment of FIGS. 2-3, first passage 62 is a horizontal passage which is usually used in known in the art ball valves, and second passage 64 is partially vertical and partially horizontal. The horizontal part of second passage 64 and part of first passage 65 form common passage 65. Common passage 65 is adapted to be fluidly connected to inlet 32 when valve 100 is actuated (i.e., a fluid passes through the valve).

According to some embodiments, first actuating stem 70 is adapted to control the passage of the fluid between inlet 32 and first outlet 30 by reconfiguring ball member 60 from a SHUT OFF POSITION to a FULL FLOW POSITION, and vice versa. In the SHUT OFF POSITION, the passage of the fluid between inlet 32 and first outlet 30 through first passage 62 is prevented, and in the FULL FLOW POSITION, the passage of the fluid between inlet 32 and first outlet 30 through first passage 62 is available. Second actuating stem 72 is adapted to control the passage of the fluid between inlet 32 and second outlet 34 by reconfiguring controlling end 74 from a CLOSED METERING POSITION to an OPENED METERING POSITION, and vice versa. In the CLOSED METERING POSITION, the passage of the fluid between inlet 32 and second outlet 34 through second passage 64 is prevented, and in the OPENED METERING POSITION, the passage of the fluid between inlet 32 and second outlet 34 through second passage 64 is available.

According to a preferred embodiment of the present invention, the direction of the passage of the fluid is from inlet 32 to first outlet 30 and/or second outlet 34. According to other embodiments, the direction of the passage of the fluid is from first outlet 30 and/or second outlet 34 to inlet 32.

According to the embodiments of FIGS. 2-3, the first and the second actuating stems 70 and 72 are adapted to reconfigure the valve, so as the provide or prevent passage of the fluid through the valve, by rotational means. According to a specific embodiment, second actuating stem 72 is threadable within second opening 52 of second bonnet 50.

As illustrated in FIG. 2, second actuating stem 72 is in the OPENED METERING POSITION, and first actuating stem 70 is in the SHUT OFF POSITION, such that the fluid is able to pass through valve 100 between inlet 32 and second outlet 34 through second passage 64. In this figure, valve 100 can be used as a known in the art needle/metering valve.

As illustrated in FIG. 3, second actuating stem 72 is in the CLOSED METERING POSITION, and first actuating stem 70 is in the FULL FLOW POSITION, such that the fluid is able to pass between inlet 32 and first outlet 30 through first passage 62. In this figure, valve 100 can be used as a known in the art ball valve.

According to other embodiments, in a combination of a CLOSED METERING POSITION of second actuating stem 70 with a SHUT OFF POSITION of first actuating stem 72, the fluid is unable to pass through valve 100 from inlet 32 to first outlet 30 and to second outlet 34, so the valve 100 is in shut-off position.

According to other embodiments, in a combination of an OPENED METERING POSITION of second actuating stem 70 with a FULL FLOW POSITION of first actuating stem 72, the fluid is able to pass between inlet 32 and first outlet 30, and between inlet 32 and second outlet 34 in a combined manner.

As can be seen in FIGS. 2-3, valve 100 further comprises a first packing bolt 80 threadably connectable to the inner side (to opening 42) of first bonnet 40. First packing bolt 80 is adapted to compress a first packing material 85 which is located between first packing bolt 80 and first actuating stem 70. Furthermore, valve 100 comprises a second packing nut 82 threadably connected to the outside portion of second bonnet 50. Second packing nut 82 is adapted to compress a second packing material 87 which is located between second packing nut 82 and second actuating stem 72.

According to the embodiment of FIGS. 2-3, first actuating stem 70 comprises a first handle 90 adapted to rotate first actuating stem 70, and second actuating stem 72 comprises a second handle 92 adapted to rotate second actuating stem 72.

Reference is now made to FIGS. 4a-b which schematically illustrate perspective view of valve 100 of the present invention. In FIG. 4a, second actuating stem 72 is in the OPENED METERING POSITION, and first actuating stem 70 is in the SHUT OFF POSITION. In FIG. 4b, second actuating stem 72 is in the CLOSED METERING POSITION, and first actuating stem 70 is in the FULL FLOW POSITION.

Figures 5A, 5B:
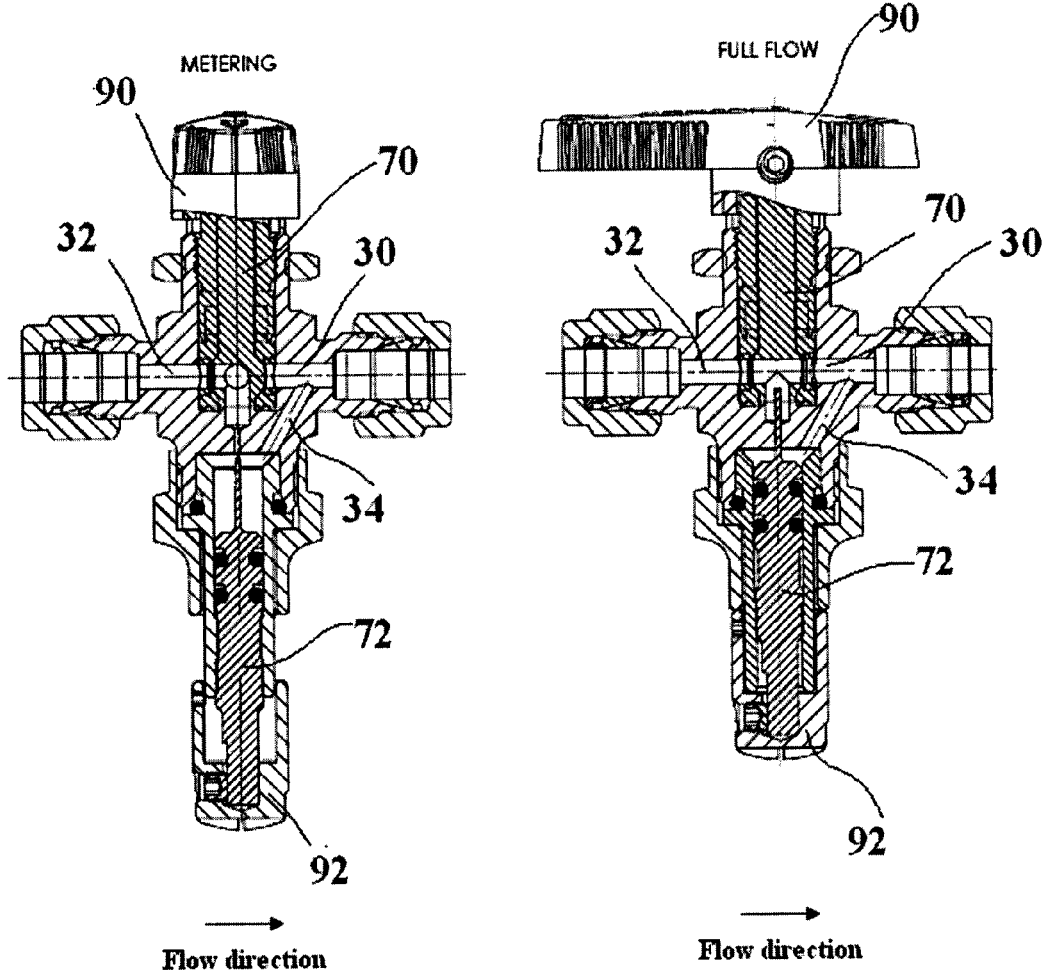
FIGS. 5a, 5b, 6a, 6b and 7a to 7c are cross-sectional views of the present invention functioning as a valve in full flow, metering and shut off states, respectively.

Reference is now made to FIGS. 5a to 5b, presenting one preferred embodiment of the current invention. The valve is switchable between METERING and FULL FLOW configurations. As shown in FIG. 5a, the metering configuration is characterized by a position of the stem 70 providing a fluid communication between the inlet 32 and the outlet 34. A position of the stem 72 controls a rate flow through the valve. FIG. 5b depicts the FULL FLOW configuration, where the stem 70 provides a straight passage from the inlet 32 to the outlet 30.

Figure 6A:
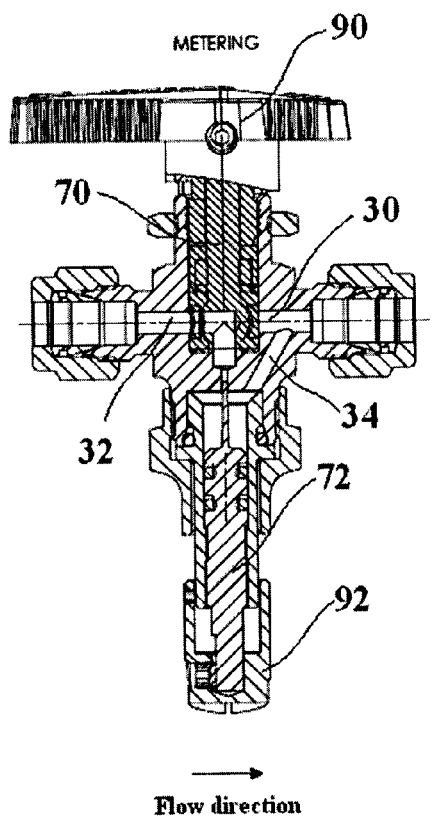
Figure 6B:
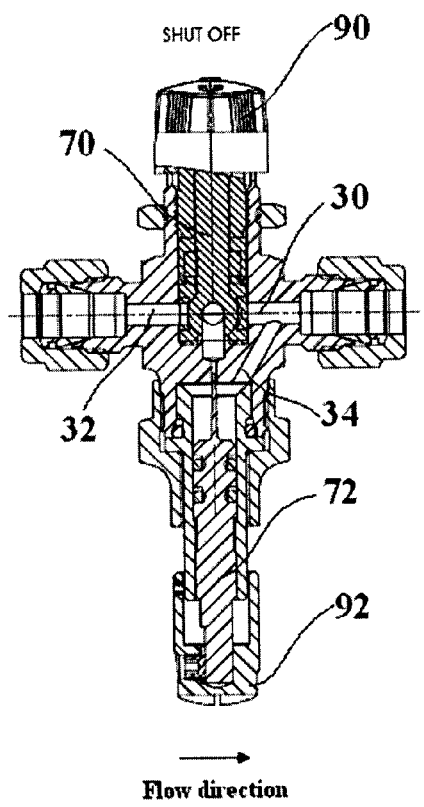

Reference is now made to FIGS. 6a and 6b, presenting another preferred embodiment of the current invention. The valve is switchable between METERING and SHUT OFF configurations. As shown in FIG. 6a, the stems 70 and 72 are in the positions corresponding to METERING configuration. The stem positions are similar to the positions presented in FIG. 5a. FIG. 6b presents SHUT OFF configuration where the stem 70 blocks fluid communication of the inlet 32 with the outlets 30 and 34.

Figures 7A, 7B, 7C:
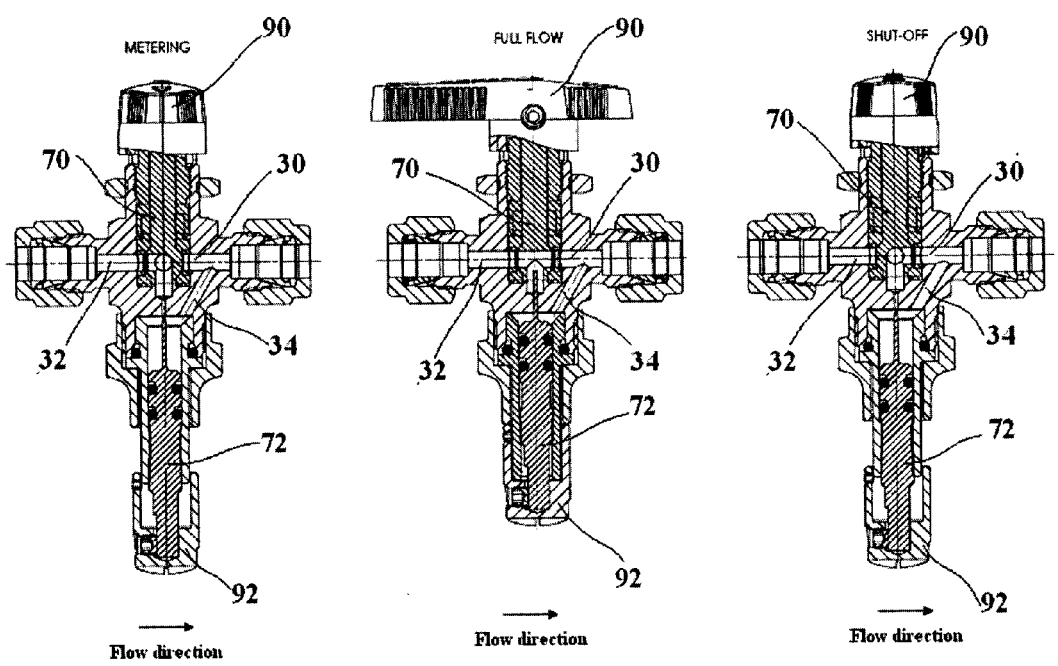

Reference is now made to FIGS. 7a to 7c, presenting a further preferred embodiment of the current invention. The valve is switchable between METERING, FULL FLOW and SHUT OFF configurations. As shown in FIG. 7a, the stems 70 and 72 are in the positions corresponding to METERING configuration. The stem positions are similar to the positions presented in FIG. 5a. FIG. 7b depicts the FULL FLOW configuration, where the stem 70 provides a straight passage from the inlet 32 to the outlet 30 similar to configuration presented in FIG. 5b. The SHUT OFF configuration shown in FIG. 7c is characterized by blocking fluid communication of the inlet 32 with the outlets 30 and 34 by the stem 70 similar to the configuration presented in FIG. 6b.

The invention claimed is:

1. A valve for controlling a passage of a fluid, comprising:
    a. a body having: a first bore and a second bore extending axially inwardly from the exterior of said body and a valve chamber therebetween, a first outlet fluidly connected to said valve chamber, and an inlet fluidly connected to said valve chamber;
    b. a first bonnet connectable to said first bore and having a first opening axially aligned with said first bore;
    c. a second bonnet connectable to said second bore and having a second opening axially aligned with said second bore;
    d. a ball member adapted to be disposed within said valve chamber, said ball member comprising a first passage adapted to allow passage of said fluid between said inlet and said first outlet; and
    e. a first actuating stem connectable to said ball member adapted to be located within said first opening of said first bonnet and to control the passage of said fluid between said inlet and said first outlet;
    said valve further comprises: a second outlet fluidly connectable to said valve chamber through said second opening of said second bonnet; a second passage within said ball member adapted to provide passage of said fluid between said inlet and said second outlet; and a second actuating stem adapted to be located within said second opening of said second bonnet and having a controlling end fitted to be received within said second bore, so as to control the passage of said fluid between said second outlet and said inlet;

wherein said first and second bores are axially aligned, and said first and second actuating stems are positioned opposite in an in-line manner.

2. The valve according to claim 1, wherein said inlet is fluidly connectable to a fluid source.

3. The valve according to claim 1, wherein at least part of said first passage and at least part of said second passage share a common passage.

4. The valve according to claim 1, wherein said first actuating stem is adapted to control the passage of said fluid between said inlet and said first outlet by reconfiguring said ball member from a SHUT OFF POSITION to an FULL FLOW POSITION, and vice versa, in said SHUT OFF POSITION said passage of said fluid between said inlet and said first outlet through said first passage is prevented, and in said FULL FLOW POSITION said passage of said fluid between said inlet and said first outlet through said first passage is available; further wherein said second actuating stem is adapted to control the passage of said fluid between said inlet and said second outlet by reconfiguring said controlling end from a CLOSED METERING POSITION to a OPENED METERING POSITION, and vice versa, in said SHUT OFFMETERING POSITION said passage of said fluid between said inlet and said second outlet through said second passage is prevented, and in said OPENED METERING POSITION said passage of said fluid between said inlet and said second outlet through said second passage is available.

5. The valve according to claim 4, wherein in a combination of said CLOSED METERING POSITION of said second actuating stem, and said FULL FLOW POSITION of said first actuating stem, said fluid is able to pass exclusively between said inlet and said first outlet.

6. The valve according to claim 4, wherein in a combination of said OPENED METERING POSITION of said second actuating stem, and said SHUT OFF POSITION of said first actuating stem, said fluid is able to pass exclusively between said inlet and said second outlet.

7. The valve according to claim 6, wherein said second actuating stem is in an intermediate position between said OPENED METERING POSITION and CLOSED METERING POSITION.

8. The valve according to claim 4, wherein in a combination of said OPENED METERING POSITION of said second actuating stem, and said FULL FLOW POSITION of said fist actuating stem, said fluid is able to pass between said inlet and said first outlet, and between said inlet and said second outlet in a combined manner.

9. The valve according to claim 8, wherein said second actuating stem is in an intermediate position between said OPENED METERING POSITION and CLOSED METERING POSITION.

10. The valve according to claim 1, further comprising a first packing bolt threadably connectable to said first bonnet, said first packing bolt is adapted to compress a first packing material locatable between said first packing bolt and said first actuating stem.

11. The valve according to claim 10, wherein said first packing bolt is threadably connectable to said first opening of said first bonnet.

12. The valve according to claim 1, further comprising a second packing nut threadably connectable to said second bonnet, said second packing nut is adapted to compress a second packing material locatable between said second packing nut and said second actuating stem.

13. The valve according to claim 12, wherein said second packing nut is threadably connectable to said the outer portion of said second bonnet.

14. The valve according to claim 1, wherein said first actuating stem comprises a first handle adapted to rotate said first actuating stem.

15. The valve according to claim 1, wherein said second actuating stem comprises a second handle adapted to rotate said second actuating stem.

16. A method of manufacturing a valve, comprising steps of:
a. providing a body having: a first bore and a second bore extending axially inwardly from the exterior of said body and defining a valve chamber therebetween, a first outlet fluidly connected to said valve chamber, and an inlet fluidly connected to said valve chamber;
b. disposing a ball member within said valve chamber, said ball member comprising a first passage adapted to allow passage of said fluid between said inlet and said first outlet;
c. connecting a first bonnet having a first opening to said first bore, such that said first bonnet being axially aligned with said first bore;
d. connecting a second bonnet having a second opening to said second, such that said second bonnet being axially aligned with said second bore;
e. connecting a first actuating stem to said ball member, said first actuating stem being adapted to be threaded within said first opening of said first bonnet and to control the passage of said fluid between said inlet and said first outlet;
f. providing a body having a second outlet connectable to said valve chamber through said second bonnet;
g. providing a second passage within said ball member adapted to provide passage of said fluid between said inlet and said second outlet;
h. connecting a second actuating stem to said second bonnet by inserting said second actuating stem to said second opening of said second bonnet, said second actuating stem having a controlling stem fitted to be received within said second bore, so as to control the passage of said fluid between said inlet and said second outlet;
wherein said first and second bores are axially aligned, and said first and second actuating stems are positioned opposite in an in-line manner.

17. The method according to claim 16, wherein at least part of said first passage and at least part of said second passage share a common passage.

18. The method according to claim 16, wherein said first actuating stem is adapted to control the passage of said fluid between said inlet and said first outlet by reconfiguring said ball member from a SHUT OFF POSITION to a FULL FLOW POSITION, and vice versa, in said SHUT OFF POSITION said passage of said fluid between said inlet and said first outlet through said first passage is prevented, and in said FULL FLOW POSITION said passage of said fluid between said inlet and said first outlet through said first passage is available; further wherein said second actuating stem is adapted to control the passage of said fluid between said inlet and said second outlet by reconfiguring said controlling end from a CLOSED METERING POSITION to an OPENED METERING POSITION, and vice versa, in said CLOSED METERING POSITION said passage of said fluid between said inlet and said second outlet through said second passage is prevented, and in said OPENED METERING POSITION said passage of said fluid between said inlet and said second outlet through said second passage is available.

19. The method according to claim 16, wherein said second actuating stem is adapted to provide more accurate control than said first actuating stem for the passage of said fluid from said inlet.

20. The method according to claim 16, further comprising steps of:
   providing a first packing bolt; compressing a first packing material between said first packing bolt and said first actuating stem; and threadably connecting said first packing bolt to said first bonnet.

21. The method according to claim 16, further comprising steps of:
   providing a second packing nut; compressing a second packing material between said second packing nut and said second actuating stem; and threadably connecting said second packing nut to said second bonnet.

* * * * *